US009965392B2

(12) United States Patent
Asaro et al.

(10) Patent No.: US 9,965,392 B2
(45) Date of Patent: May 8, 2018

(54) MANAGING COHERENT MEMORY BETWEEN AN ACCELERATED PROCESSING DEVICE AND A CENTRAL PROCESSING UNIT

(71) Applicants: Advanced Micro Devices, Inc., Sunnyvale, CA (US); ATI Technologies ULC, Markham (CA)

(72) Inventors: Anthony Asaro, Markham (CA); Kevin Normoyle, Big Pine, CA (US); Mark Hummel, Franklin, MA (US)

(73) Assignees: Advanced Micro Devices, Inc., Sunnyvale, CA (US); ATI Technologies ULC, Markham, Ontario (CA)

( * ) Notice: Subject to any disclaimer, the term of this patent is extended or adjusted under 35 U.S.C. 154(b) by 0 days. days.

(21) Appl. No.: 15/246,056

(22) Filed: Aug. 24, 2016

(65) Prior Publication Data

US 2016/0364334 A1 Dec. 15, 2016

Related U.S. Application Data

(63) Continuation of application No. 13/601,126, filed on Aug. 31, 2012, now Pat. No. 9,430,391.
(Continued)

(51) Int. Cl.
*G06F 12/00* (2006.01)
*G06F 13/00* (2006.01)
(Continued)

(52) U.S. Cl.
CPC ...... *G06F 12/0815* (2013.01); *G06F 12/0806* (2013.01); *G06F 12/0835* (2013.01);
(Continued)

(58) Field of Classification Search
CPC ............. G06F 12/0815; G06F 12/0804; G06F 12/0848; G06F 12/0835; G06F 12/0837;
(Continued)

(56) References Cited

U.S. PATENT DOCUMENTS

| 5,748,938 A | 5/1998 | Kahle |
| 6,175,930 B1 | 1/2001 | Arimilli et al. |

(Continued)

OTHER PUBLICATIONS

Berge, Thomas B., Maintaining I/O Data Coherence in Embedded Multicore Systems, IEEE Computer Society, May/Jun. 2009, pp. 10-19.*

(Continued)

*Primary Examiner* — Daniel C Chappell
*Assistant Examiner* — Shane Woolwine
(74) *Attorney, Agent, or Firm* — Volpe and Koenig, P.C.

(57) ABSTRACT

Existing multiprocessor computing systems often have insufficient memory coherency and, consequently, are unable to efficiently utilize separate memory systems. Specifically, a CPU cannot effectively write to a block of memory and then have a GPU access that memory unless there is explicit synchronization. In addition, because the GPU is forced to statically split memory locations between itself and the CPU, existing multiprocessor computing systems are unable to efficiently utilize the separate memory systems. Embodiments described herein overcome these deficiencies by receiving a notification within the GPU that the CPU has finished processing data that is stored in coherent memory, and invalidating data in the CPU caches that the GPU has finished processing from the coherent memory. Embodiments described herein also include dynamically partitioning a GPU memory into coherent memory and local memory through use of a probe filter.

12 Claims, 5 Drawing Sheets

Related U.S. Application Data

(60) Provisional application No. 61/617,479, filed on Mar. 29, 2012.

(51) Int. Cl.
  *G06F 13/28* (2006.01)
  *G06F 12/0815* (2016.01)
  *G06F 12/0806* (2016.01)
  *G06F 12/0831* (2016.01)
  *G06F 12/0846* (2016.01)
  G06F 12/0837 (2016.01)
  G06F 12/0804 (2016.01)

(52) U.S. Cl.
  CPC ...... *G06F 12/0848* (2013.01); *G06F 12/0804* (2013.01); *G06F 12/0837* (2013.01); *G06F 2212/1021* (2013.01); *G06F 2212/1024* (2013.01); *G06F 2212/283* (2013.01); *G06F 2212/608* (2013.01); *Y02B 60/1225* (2013.01)

(58) Field of Classification Search
  CPC ....... G06F 2212/1021; G06F 2212/283; G06F 2212/1024; G06F 2212/608; G06F 12/0806; Y02B 60/1225
  USPC ................. 711/141–145, 147, 150, 151, 152
  See application file for complete search history.

(56) References Cited

U.S. PATENT DOCUMENTS

| | | |
|---|---|---|
| 2003/0210248 A1 | 11/2003 | Wyatt |
| 2004/0088492 A1 | 5/2004 | Glaseo |
| 2007/0050559 A1 | 3/2007 | Alsup |
| 2009/0300293 A1 | 12/2009 | Mantor et al. |
| 2011/0010520 A1 | 1/2011 | Wang et al. |
| 2011/0060879 A1 | 3/2011 | Rogers et al. |
| 2012/0079102 A1* | 3/2012 | Damodaran ....... H03K 19/0016 709/224 |
| 2013/0125097 A1* | 5/2013 | Ebcioglu ............ G06F 17/5045 717/136 |

OTHER PUBLICATIONS

International Search Report and Written Opinion for International Application No. PCT/US2013/033158, European Patent Office, Netherlands, dated Jan. 9, 2014 (17 pages).

\* cited by examiner

MANAGING COHERENT MEMORY BETWEEN AN ACCELERATED PROCESSING DEVICE AND A CENTRAL PROCESSING UNIT

CROSS REFERENCE TO RELATED APPLICATIONS

This application is a continuation of U.S. patent application Ser. No. 13/601,126, filed Aug. 31, 2012, which claims the benefit of U.S. Provisional Application No. 61/617,479, filed Mar. 29, 2012 which are incorporated by reference as if fully set forth.

FIELD OF INVENTION

The present invention is generally directed to computing operations performed in computer systems. More particularly, the present invention is directed to a coherent memory model that is shared between processors.

BACKGROUND

The desire to use a graphics processing unit (GPU) for general computation has become much more pronounced recently due to the GPU's exemplary performance per unit power and/or cost. The computational capabilities for GPUs, generally, have grown at a rate exceeding that of the corresponding central processing unit (CPU) platforms. This growth, coupled with the explosion of the mobile computing market (e.g., notebooks, mobile smart phones, tablets, etc.) and its necessary supporting server/enterprise systems, has been used to provide a specified quality of desired user experience. Consequently, the combined use of CPUs and GPUs for executing workloads with data parallel content is becoming a volume technology.

However, GPUs have traditionally operated in a constrained programming environment, available primarily for the acceleration of graphics. These constraints arose from the fact that GPUs did not have as rich a programming ecosystem as CPUs. Their use, therefore, has been mostly limited to two dimensional (2D) and three dimensional (3D) graphics and a few leading edge multimedia applications, which are already accustomed to dealing with graphics and video application programming interfaces (APIs).

With the advent of multi-vendor supported OpenCL® and DirectCompute®, standard APIs and supporting tools, the limitations of the GPUs in traditional applications has been extended beyond traditional graphics. Although OpenCL and DirectCompute are a promising start, there are many hurdles remaining to creating an environment and ecosystem that allows the combination of a CPU and a GPU to be used as fluidly as the CPU for most programming tasks.

Existing computing systems often include multiple processing devices. For example, some computing systems include both a CPU and a GPU on separate chips (e.g., the CPU might be located on a motherboard and the GPU might be located on a graphics card) or in a single chip package. Both of these arrangements, however, still include significant challenges associated with (i) efficient scheduling, (ii) providing quality of service (QoS) guarantees between processes, (iii) programming model, (iv) compiling to multiple target instruction set architectures (ISAs), and (v) separate memory systems,—all while minimizing power consumption.

The existing multiprocessor computing systems often have insufficient memory coherency and, consequently, are unable to efficiently utilize the separate memory systems. For example, the CPU cannot effectively write to a block of memory and then access that memory from the GPU device unless the GPU explicitly synchronizes or flushes its caches. Otherwise, the write will not be made visible to the GPU device. This is because a GPU is optimized for a weak consistency memory model. In particular, load commands may be reordered after other load commands and store commands may be reordered after other store commands.

In addition, in existing multiprocessor computing systems the CPU is forced to statically split memory locations between two different memory heaps: one is private to the CPU private and the other is shared coherently with the CPU. As result of statically splitting memory locations between two memory heaps, existing multiprocessor computing systems are unable to efficiently utilize the separate memory systems.

SUMMARY

What is needed, therefore, are methods and systems that provide sufficient memory coherency to facilitate efficient use of separate memories in a multiprocessor computing system Although GPUs, accelerated processing units (APUs), and general purpose use of the graphics processing unit (GPGPU) are commonly used terms in this field, the expression "accelerated processing device (APD)" is considered to be a broader expression. For example, APD refers to any cooperating collection of hardware and/or software that performs those functions and computations associated with accelerating graphics processing tasks, data parallel tasks, or nested data parallel tasks in an accelerated manner compared to conventional CPUs, conventional GPUs, software and/or combinations thereof.

Embodiments of the present invention, in certain circumstances, provide systems and methods for managing a coherent memory between an APD and a CPU. According to a first embodiment, a method is provided for receiving a notification within the APD that the CPU has finished processing data that is stored in the coherent memory. The method also includes invalidating data in the CPU caches that the APD has finished processing from the coherent memory. According to a second embodiment, a method is provided for dynamically partitioning APD memory into APD coherent memory and APD local memory through use of a probe filter.

Additional features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

The accompanying drawings, which are incorporated herein and form part of the specification, illustrate the present invention and, together with the description, further serve to explain the principles of the invention and to enable a person skilled in the pertinent art to make and use the invention. Various embodiments of the present invention are described below with reference to the drawings, wherein like reference numerals are used to refer to like elements throughout.

DETAILED DESCRIPTION OF THE PREFERRED EMBODIMENTS

In the detailed description that follows, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The term "embodiments of the invention" does not require that all embodiments of the invention include the discussed feature, advantage or mode of operation. Alternate embodiments may be devised without departing from the scope of the invention, and well-known elements of the invention may not be described in detail or may be omitted so as not to obscure the relevant details of the invention. In addition, the terminology used herein is for the purpose of describing particular embodiments only and is not intended to be limiting of the invention. For example, as used herein, the singular forms "a", "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Figure 1:
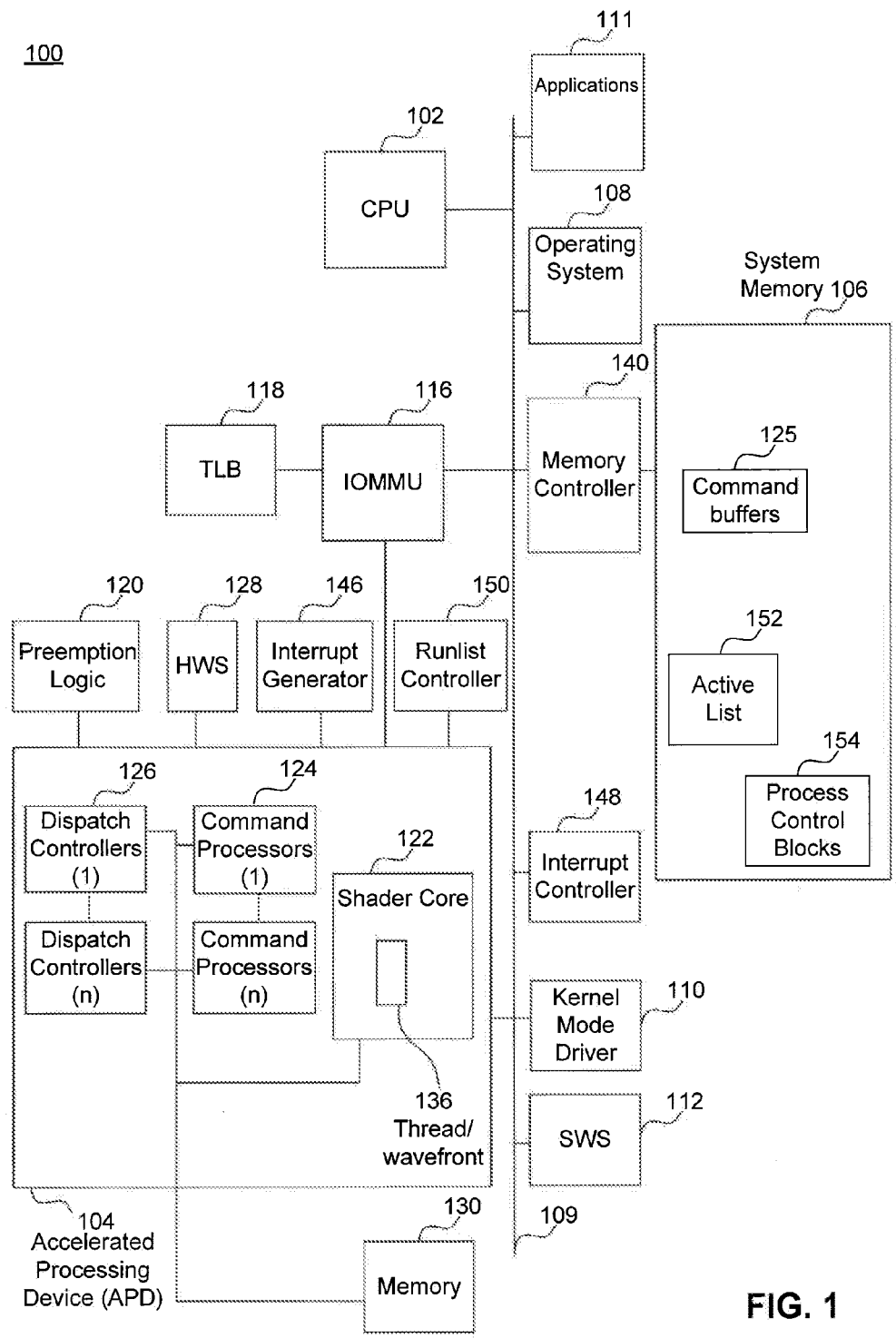
FIG. 1 is a block diagram of an illustrative computing system in accordance with embodiments of the invention.

FIG. 1 is an exemplary illustration of a unified computing system 100 including two processors, a CPU 102 and an APD 104. CPU 102 can include one or more single or multi core CPUs. In one embodiment of the present invention, the system 100 is formed on a single silicon die or package, combining CPU 102 and APD 104 to provide a unified programming and execution environment. This environment enables the APD 104 to be used as fluidly as the CPU 102 for some programming tasks. However, it is not an absolute requirement of this invention that the CPU 102 and APD 104 be formed on a single silicon die. In some embodiments, it is possible for them to be formed separately and mounted on the same or different substrates.

In one example, system 100 also includes a memory 106, an operating system 108, and a communication infrastructure 109. The operating system 108 and the communication infrastructure 109 are discussed in greater detail below.

The system 100 also includes a kernel mode driver (KMD) 110, a software scheduler (SWS) 112, and a memory management unit 116, such as input/output memory management unit (IOMMU). Components of system 100 can be implemented as hardware, firmware, software, or any combination thereof. A person of ordinary skill in the art will appreciate that system 100 may include one or more software, hardware, and firmware components in addition to, or different from, that shown in the embodiment shown in FIG. 1.

In one example, a driver, such as KMD 110, typically communicates with a device through a computer bus or communications subsystem to which the hardware connects. When a calling program invokes a routine in the driver, the driver issues commands to the device. Once the device sends data back to the driver, the driver may invoke routines in the original calling program. In one example, drivers are hardware-dependent and operating-system-specific. They usually provide the interrupt handling required for any necessary asynchronous time-dependent hardware interface.

CPU 102 can include (not shown) one or more of a control processor, field programmable gate array (FPGA), application specific integrated circuit (ASIC), or digital signal processor (DSP). CPU 102, for example, executes the control logic, including the operating system 108, KMD 110, SWS 112, and applications 111, that control the operation of computing system 100. In this illustrative embodiment, CPU 102, according to one embodiment, initiates and controls the execution of applications 111 by, for example, distributing the processing associated with that application across the CPU 102 and other processing resources, such as the APD 104.

APD 104, among other things, executes commands and programs for selected functions, such as graphics operations and other operations that may be, for example, particularly suited for parallel processing. In general, APD 104 can be frequently used for executing graphics pipeline operations, such as pixel operations, geometric computations, and rendering an image to a display. In various embodiments of the present invention, APD 104 can also execute compute processing operations (e.g., those operations unrelated to graphics such as, for example, video operations, physics simulations, computational fluid dynamics, etc.), based on commands or instructions received from CPU 102.

For example, commands can be considered as special instructions that are not typically defined in the ISA. A command may be executed by a special processor such a dispatch processor, command processor, or network controller. On the other hand, instructions can be considered, for example, a single operation of a processor within a computer architecture. In one example, when using two sets of ISAs, some instructions are used to execute x86 programs and some instructions are used to execute kernels on an APD compute unit.

In an illustrative embodiment, CPU 102 transmits selected commands to APD 104. These selected commands can include graphics commands and other commands amenable to parallel execution. These selected commands, that can also include compute processing commands, can be executed substantially independently from CPU 102.

APD 104 can include its own compute units (not shown), such as, but not limited to, one or more SIMD processing cores. As referred to herein, a SIMD is a pipeline, or programming model, where a kernel is executed concurrently on multiple processing elements each with its own data and a shared program counter. All processing elements execute an identical set of instructions. The use of predication enables work-items to participate or not for each issued command.

In one example, each APD 104 compute unit can include one or more scalar and/or vector floating-point units and/or arithmetic and logic units (ALUs). The APD compute unit can also include special purpose processing units (not shown), such as inverse-square root units and sine/cosine units. In one example, the APD compute units are referred to herein collectively as shader core 122.

Having one or more SIMDs, in general, makes APD 104 ideally suited for execution of data-parallel tasks such as those that are common in graphics processing.

A work-item is distinguished from other executions within the collection by its global ID and local ID. In one example, a subset of work-items in a workgroup that execute simultaneously together on a SIMD can be referred to as a wavefront 136. The width of a wavefront is a characteristic of the hardware of the compute unit (e.g., SIMD processing core). As referred to herein, a workgroup is a collection of related work-items that execute on a single compute unit. The work-items in the group execute the same kernel and share local memory and work-group barriers.

Within the system 100, APD 104 includes its own memory, such as graphics memory 130 (although memory 130 is not limited to graphics only use). Memory 130 provides a local memory for use during computations in APD 104. Individual compute units (not shown) within shader core 122 can have their own local data store (not shown). In one embodiment, APD 104 includes access to local graphics memory 130, as well as access to the memory 106. In another embodiment, APD 104 can include access to dynamic random access memory (DRAM) or other such memories (not shown) attached directly to the APD 104 and separately from memory 106.

In the example shown, APD 104 also includes one or "n" number of command processors (CPs) 124. CP 124 controls the processing within APD 104. CP 124 also retrieves commands to be executed from command buffers 125 in memory 106 and coordinates the execution of those commands on APD 104.

In one example, CPU 102 inputs commands based on applications 111 into appropriate command buffers 125. As referred to herein, an application is the combination of the program parts that will execute on the compute units within the CPU and APD. A plurality of command buffers 125 can be maintained with each process scheduled for execution on the APD 104.

CP 124 can be implemented in hardware, firmware, or software, or a combination thereof. In one embodiment, CP 124 is implemented as a reduced instruction set computer (RISC) engine with microcode for implementing logic including scheduling logic.

APD 104 also includes one or "n" number of dispatch controllers (DCs) 126. In the present application, the term dispatch refers to a command executed by a dispatch controller that uses the context state to initiate the start of the execution of a kernel for a set of work groups on a set of compute units. DC 126 includes logic to initiate workgroups in the shader core 122. In some embodiments, DC 126 can be implemented as part of CP 124.

System 100 also includes a hardware scheduler (HWS) 128 for selecting a process from a run list 150 for execution on APD 104. HWS 128 can select processes from run list 150 using round robin methodology, priority level, or based on other scheduling policies. The priority level, for example, can be dynamically determined. HWS 128 can also include functionality to manage the run list 150, for example, by adding new processes and by deleting existing processes from run-list 150. The run list management logic of HWS 128 is sometimes referred to as a ran list controller (RLC).

APD 104 can have access to, or may include, an interrupt generator 146. Interrupt generator 146 can be configured by APD 104 to interrupt the operating system 108 when interrupt events, such as page faults, are encountered by APD 104. For example, APD 104 can rely on interrupt generation logic within IOMMU 116 to create the page fault interrupts noted above.

APD 104 can also include preemption and context switch logic 120 for preempting a process currently running within shader core 122. Context switch logic 120, for example, includes functionality to stop the process and save its current state (e.g., shader core 122 state, and CP 124 state).

Memory 106 can include non-persistent memory such as DRAM (not shown). Memory 106 can store, e.g., processing logic instructions, constant values, and variable values during execution of portions of applications or other processing logic. For example, in one embodiment, parts of control logic to perform one or more operations on CPU 102 can reside within memory 106 during execution of the respective portions of the operation by CPU 102.

In this example, memory 106 includes command buffers 125 that are used by CPU 102 to send commands to APD 104. Memory 106 also contains process lists and process information (e.g., active list 152 and process control blocks 154). These lists, as well as the information, are used by scheduling software executing on CPU 102 to communicate scheduling information to APD 104 and/or related scheduling hardware. Access to memory 106 can be managed by a memory controller 140, which is coupled to memory 106. For example, requests from CPU 102, or from other devices, for reading from or for writing to memory 106 are managed by the memory controller 140.

As used herein, context can be considered the environment within which the kernels execute and the domain in which synchronization and memory management is defined. The context includes a set of devices, the memory accessible to those devices, the corresponding memory properties and one or more command-queues used to schedule execution of a kernel(s) or operations on memory objects.

In the example above, communication infrastructure 109 interconnects the components of system 100 as needed. Communication infrastructure 109 can include (not shown) one or more of a peripheral component interconnect (PCI) bus, extended PCI (PCI-E) bus, advanced microcontroller bus architecture (AMBA) bus, advanced graphics port (AGP), or other such communication infrastructure. Communications infrastructure 109 can also include an Ethernet, or similar network, or any suitable physical communications infrastructure that satisfies an application's data transfer rate requirements. Communication infrastructure 109 includes the functionality to interconnect components including components of computing system 100.

In some embodiments, based on interrupts generated by an interrupt controller, such as interrupt controller 148, operating system 108 invokes an appropriate interrupt handling routine. For example, upon detecting a page fault interrupt, operating system 108 may invoke an interrupt handler to initiate loading of the relevant page into memory 106 and to update corresponding page tables.

Figure 2:
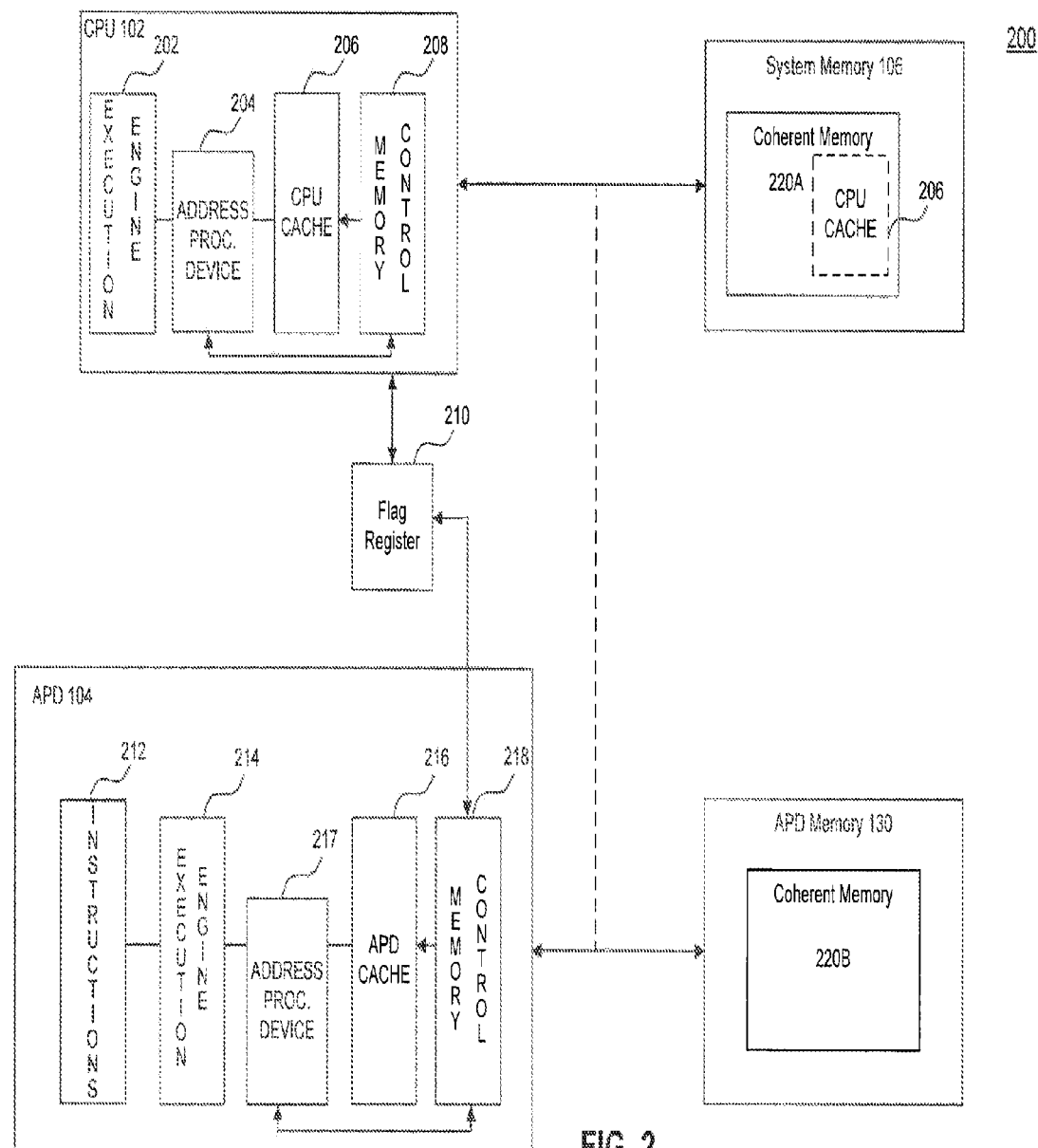
FIG. 2 is a block diagram of an illustrative computing system in accordance with embodiments of the invention.

In some embodiments, SWS 112 maintains an active list 152 in memory 106 of processes to be executed on APD 104. SWS 112 also selects a subset of the processes in active list 152 to be managed by HWS 128 in the hardware. Information relevant for running each process on APD 104 is communicated from CPU 102 to APD 104 through process control blocks (PCB) 154. FIG. 2 is an illustration of an exemplary block diagram of a computing system 200 based upon a coherent memory model in accordance with embodiments of the present invention. As used herein, a coherent memory model broadly describes the permissible interactions of memory operations from multiple wavefronts operating in a computing system, such as computing system 100 using CPU 102 and APD 104.

Computing system 200 provides a more detailed view of the internal architecture of computing system 100, shown in FIG. 1. For example, computing system 200 includes CPU 102, APD 104, memory 106, and APD memory 130 of computing system 100. Computing system 200 also includes a flag register 210. Flag register 210 is associated with a synchronization variable stored in system memory 106. In the exemplary computing system 200, CPU 102 can include an execution engine 202, a CPU cache 206, and a memory controller 208. APD 104 can include an instruction set 212, execution engine 214, APD cache 216, and a memory controller 218. System memory 106 and APD memory 130 can include coherent memories 220A and 220B, respectively. As would be appreciated by those skilled in the relevant arts, computing system 200 is not limited to the components shown in FIG. 2.

Execution engine 202 executes a variety of commands during the operation of CPU 102. Many of these commands require that execution engine 202 perform operations on data stored in coherent memory 220A. Execution engine 202 can determine where the data is stored by accessing address processing device 204 that contains a virtual address for the data. The address processing device 204 contains address pointers to data that are shared between CPU 102 and APD 104. Once the address pointers are retrieved, the virtual addresses can be translated into physical addresses. For example, if the physical address for the data is located in coherent memory 220A, CPU cache 206 is queried to determine whether it is holding the data. If CPU cache 206 is not holding the requested data, memory controller 208 retrieves the data stored in coherent memory 220A, based upon the physical address. Execution engine 202 then processes the retrieved data.

The processed data is written to CPU cache 206 and coherent memory 220A. After processing, CPU 102 writes a flag to flag register 210 informing APD 104 that data is available for manipulation. Furthermore, the synchronization variable associated with flag register 210 is set to confirm the data is valid.

APD 104 periodically monitors flag register 210 for a notification when data is available for processing commands. When notification is received, execution engine 214 executes a load acquire command.

As understood by those of skill in the art, the load acquire command guarantees that all subsequent loads occur after the load acquire and that all subsequent loads read coherent memory. This requirement ensures that subsequent loads are not serviced by stale data in the APD cache. In the example above, when the load acquire command is executed, APD 104 waits to execute any read requests initiated after the load acquire command. Once all outstanding read requests have been fenced, APD 104 monitors flag register 210 to ensure that the data to be operated on includes valid updates.

In one embodiment, execution engine 214 determines where the data is stored by acquiring an address pointer from address processing device 217. The address pointer can be a virtual address that is translated into a physical address. Once the physical address is received, memory control 218 can retrieve the data from coherent memory 220A. Execution engine 214 performs operations on data retrieved from coherent memory 220A within system memory 106. Once the data is processed, execution engine 214 executes a store release command which guarantees that all previous memory writes are visible to other devices.

For example, when the store release command is executed within execution engine 214, APD 104 flushes all data within APD cache 216 to coherent memory 220B to ensure the data is valid. In other words, APD 104 waits for all store commands executed prior to the store release command to complete. After validity has been insured, APD 104 writes a flag to flag register 210 providing notification that data within coherent memory 220B is available to other devices, such as CPU 102. Furthermore, the synchronization variable associated with flag register 210 is set to confirm validity of the data. At this point, the store release command can complete execution.

Figure 3:
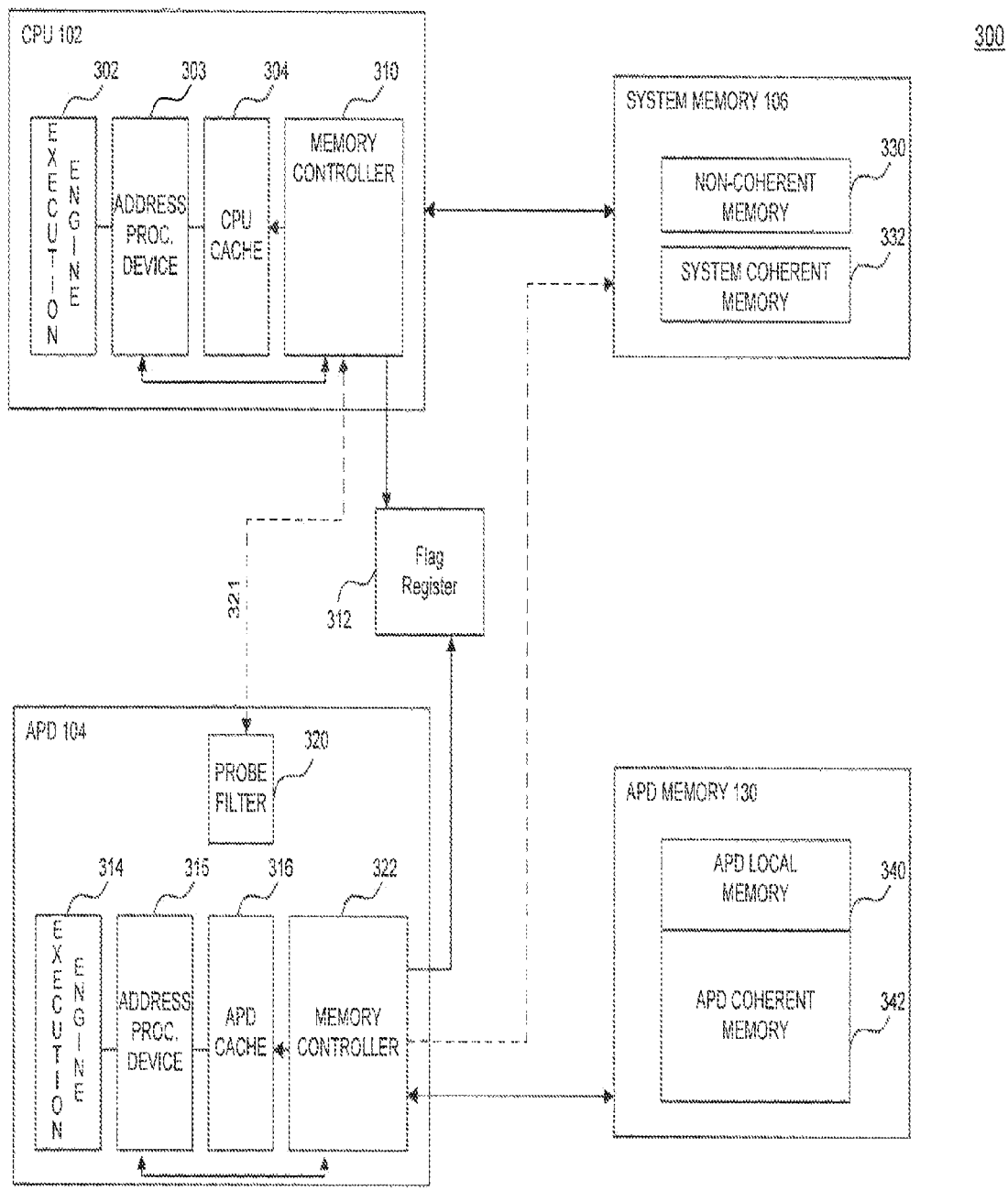
FIG. 3 is a block diagram of an illustrative computing system in accordance with embodiments of the invention.

FIG. 3 is a block diagram illustration of an exemplary computing system 300 utilizing coherent memory model principles, according to another embodiment of the present invention. In the computing system 300, APD memory 130 can be dynamically partitioned into APD coherent memory 342 and APD local memory 340. In the embodiment of FIG. 3, coherency between CPU 102 and APD 104 is achieved through use of a probe filter within APD 104, as described in greater detail below.

As with computing system at 200 of FIG. 2, computing system 300 includes CPU 102, APD 104, system memory 106, and APD local memory 130. Computing system 300 also includes flag register 312.

CPU 102 includes an execution engine 302, an address processing device 303, CPU cache 304, and a memory controller 310. APD 104 includes execution engine 314 an address processing device 315, APD cache 316, a probe filter 320, and a memory controller 322. In the exemplary embodiment of FIG. 3, system memory 106 includes non-coherent memory 330 and system coherent memory 332. APD memory 130 includes ADP local memory 340 and APD coherent memory 342. As would be appreciated by those skilled in the relevant arts, computing system 300 is not limited to the components shown in FIG. 3.

In the embodiment, execution engine 302 receives a command to perform an operation within CPU 102. Execution engine 302 acquires an address pointer from address processing device 303. Address processing device 303 translates the address pointer into a physical address for use by memory controller 310. Memory controller 310 uses the physical address to check CPU cache 304 and system memory 106 to determine whether the requested data can be located. Once the data has been located, execution engine 302 processes the data by executing commands.

The processed data can be stored to CPU cache 304 and system coherent memory 332. By way of example, CPU cache 304 can be a level 1 (L1) cache, level 2 (L2) cache or a level 3 (L3) cache. Memory controller 310 can also store the processed data to system coherent memory 332. System coherent memory 322 is accessible to CPU 102 and APD 104 via a PCI, PCIE, or any other suitable interconnection. Frequently used data can also be stored on CPU cache 304. Once the data is stored, memory controller 310 sets a synchronization variable within flag register 312.

The setting and operation of flag register 210, of FIG. 2, discussed above, also applies to flag register 312. Therefore, flag register 312 will not be discussed in addition detail.

Computing system 300 also includes probe filter 320. Probe filter 320 is a mechanism for monitoring and recording the addresses of cache lines used by CPU 102 or an agent thereof. The embodiment of FIG. 3, probe filter 320 is configured to optimize the performance of a computing system by reducing the number of times APD 104 searches CPU cache 304 and system coherent memory 322 to retrieve requested data.

For example, when APD 104 receives the address of the requested data, probe filter 320 determines whether that data was recently exported by CPU 102. To make this determination, the address of the requested data is compared to addresses recorded within probe filter 320. If the comparison produces a match, a probe 321 is sent to CPU 102 memory controller 310 to retrieve the data. For example, memory controller 310 can search CPU cache 304 and system coherent memory 332 to locate the exported data. When CPU memory controller 310 finds the data, commands are executed to ensure that the data is valid. For example, synchronization variables are checked to ensure the data is current.

Conversely, if the comparison fails to produce a match (i.e., the data was not recently exported by CPU 102), a driver (not shown) may elect to process the data as if the data was stored in non-coherent local memory, such as non-coherent memory 330. Responsive to the comparisons with the probe filter 320, a driver (not shown) can dynamically partition APD memory 130 into APD coherent memory 342 and APD local memory 340. Alternatively, the driver can store a portion of the allocated APD coherent memory 342 into APD local memory 340.

In this example, the received data is compared to the addresses of cache lines recently exported by CPU 102 that are recorded within probe filter 320. If the address has not been previously exported, the driver can store a portion of the APD coherent memory, containing those cache lines, into APD local memory 340. This effectively partitions and prevents the APD coherent memory 342 from being used as a shared resource between CPU 102 and APD 104. In this example, APD coherent memory 342 may be only visible to ADP 104 for the duration of its allocation, as managed by the driver.

Alternatively, APD memory 130 can be used as a dynamic resource to allocate regions within APD local memory 340—treating these regions within APD 340 as an extension of APD coherent memory 342. In this manner, APD coherent memory 342 will be available to both CPU 102 and ADP 104. In the embodiment, APD coherent memory 342 is mapped into the application virtual address space using x86 page tables. The operating system (e.g., operating system 108) is responsible for maintaining currency of the APD table lookup buffers (TLBs). In the embodiment, as described above, APD coherent memory 342 does not require additional software, such as consistency semantics, to facilitate coherent operation. For example, CPU 102 can store processed data to APD coherent memory 342 in the same manner it would store processed data to system coherent memory 322.

Figure 4:
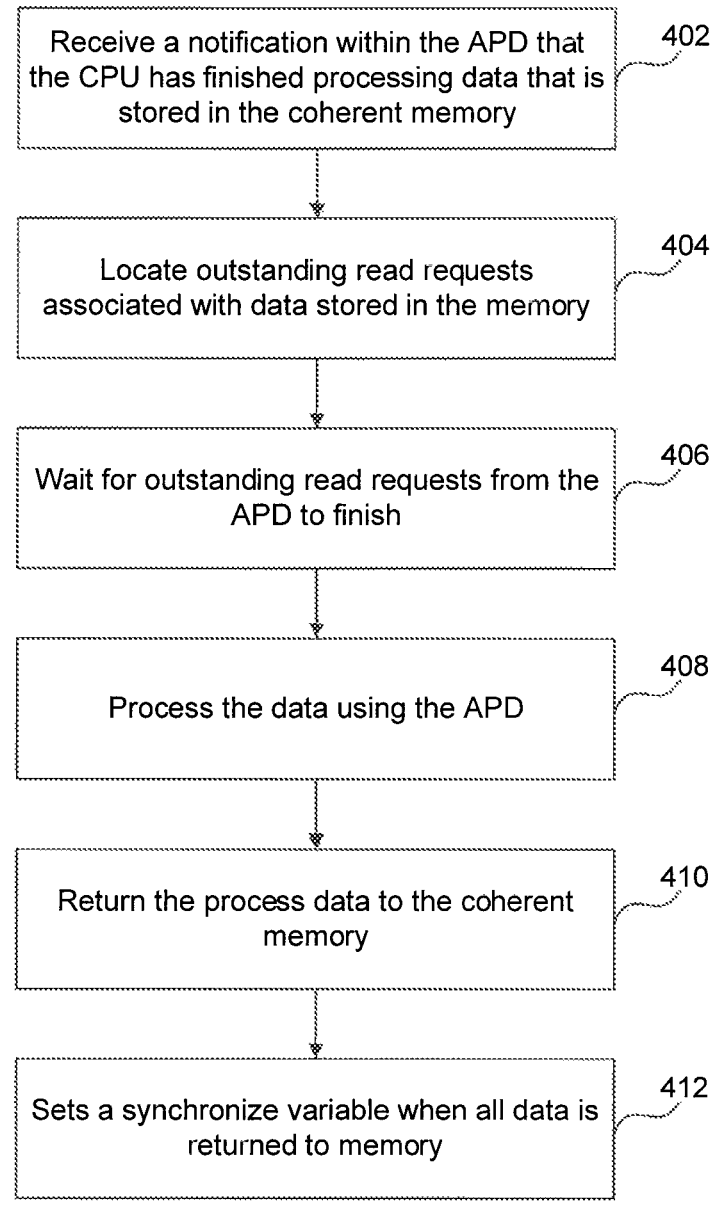
FIG. 4 is a flowchart illustrating a method of managing a coherent memory between an APD and a CPU.

FIG. 4 is a flowchart of an exemplary method 400 for practicing embodiment of the present invention. More specifically, the method of managing coherent memory between an APD and a CPU according to embodiments of the present invention. Other structural embodiments will be apparent to persons skilled in the relevant art(s) based on the following discussion. The operations shown in FIG. 4 need not occur in the order shown, nor does method 400 require all of the operations shown in FIG. 4 be performed. The operations of FIG. 4 are described in detail below.

In operation 402, a processor receives a notification indicating a data is available in a memory. For example, APD 104 receives a notification that CPU 102 has finished processing data stored in the coherent memory 220A, as shown in FIG. 2.

In operation 404, a processor locates outstanding requests associated with data stored in the memory. For example, APD 104 executes a load acquire instruction to locate outstanding read requests for data stored in coherent memory 220A. In operation 406, a processor, such as APD 104, waits for the requests to complete.

In operation 408, the data is processed by the processor. For example, an execution engine 302 that is located within APD 104 processes the data by executing commands. In operation 410, the processor returns the processed data to the memory. For example, APD 104 executes a store release instruction for the data processed by APD 104. When the store release instruction is executed, APD 104 flushes processed data, stored within APD cache 216 to coherent memory 220B, as illustrated in FIG. 2. In other words, APD 104 waits for all store commands executed prior to the store release command to complete. After validity has been insured, APD 104 writes a flag to flag register 210 providing notification that data within coherent memory 220B is available to other devices, such as CPU 102.

In operation 412, the processor sets a synchronize variable when all data is returned to the memory. For example, a synchronization variable is set by APD 104 to confirm that all the data flushed to coherent memory 220B, is valid.

Figure 5:
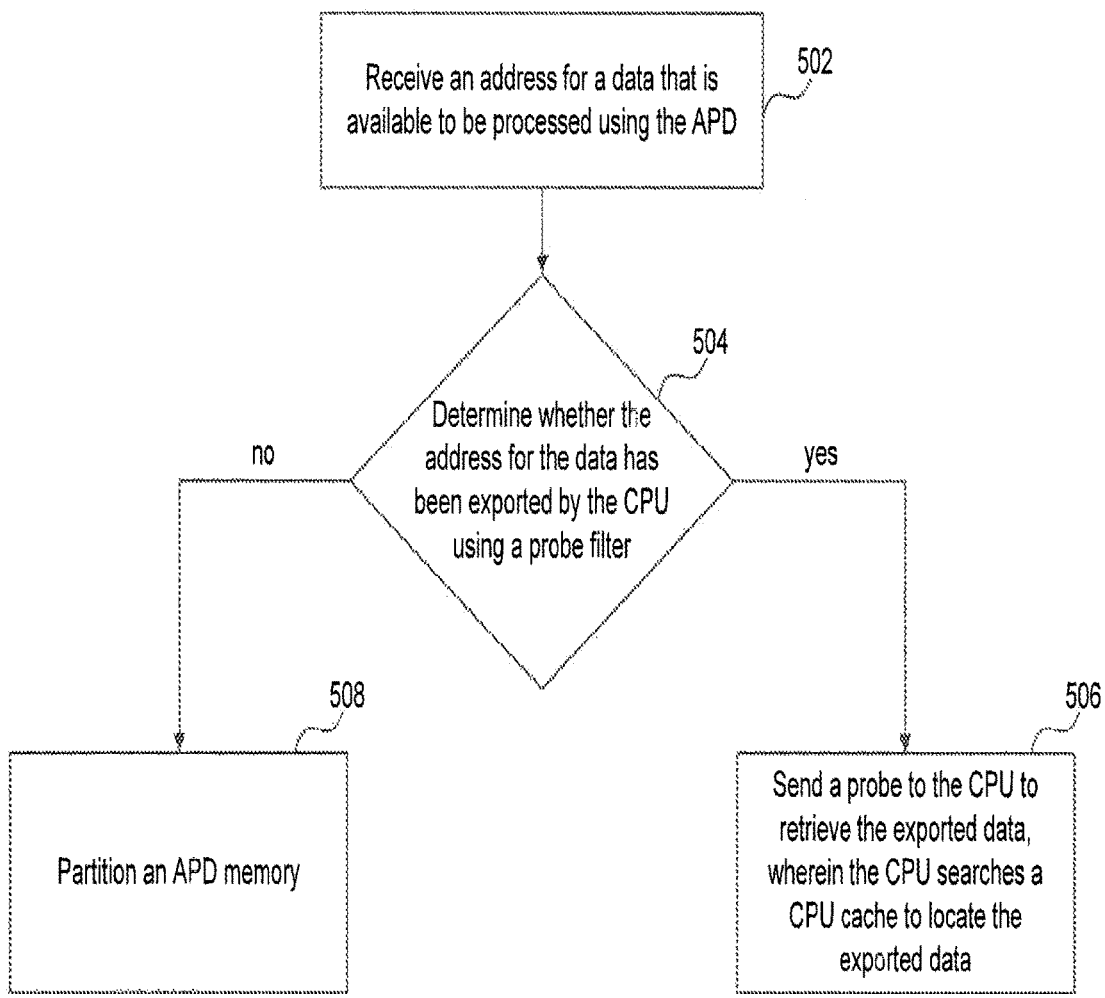
FIG. 5 is a flowchart illustrating a method of managing a coherent memory between an APD and a CPU.

FIG. 5 is a flowchart of an exemplary process 500 for managing coherent memory between an APD and a CPU, according to another embodiment of the present invention. Other structural embodiments will be apparent to persons skilled in the relevant art(s) based on the following discussion.

In operation 502, a processor receives an address for data that is available to be processed. For example, APD 104 receives an address for data that is available to be processed. In operation 504, the processor determines if another device has recently used the data. For example, APD 104 uses a probe filter 320 to determine whether the address of the associated data was previously exported by CPU 102, as described above in relation to FIG. 3. If the data was recently exported, a probe is sent to retrieve the data from the other device as depicted in operation 506. For example, if probe filter 320 determines that data was recently exported by APD 104, a probe is sent to CPU 102 to retrieve the exported data. In this example, APD 104 searches CPU cache 304 to locate the exported data.

If the data was not recently used by another device, the memory is partitioned as depicted in operation 508. For example, APD 104 uses probe filter 320 to determine if data was recently exported. If the data was recently exported, APD memory 130 is partitioned as described above.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method of managing a coherent memory between a central processing unit (CPU) and an accelerated processing device (APD), the APD performing the method comprising:
    monitoring a flag register to determine whether data stored in a coherent memory is available for processing, wherein the flag register notifies the APD that data is available for processing in the coherent memory;
    acquiring an address pointer for the data in the coherent memory from an address processing device in response to determining data stored in the coherent memory is available for processing;
    fencing outstanding read requests associated with the data stored in the coherent memory in response to the determining that data stored in the coherent memory is available for processing by the APD;
    processing the data stored in the coherent memory using the APD;
    executing a store release instruction for the data stored in the coherent memory that has been processed by the APD;
    flushing processed data that is stored in an APD cache and storing the flushed data to the coherent memory; and
    setting a synchronization variable by the APD to confirm that the data stored in the coherent memory is valid, wherein the synchronization variable is associated with the flag register.

2. The method of claim 1, further comprising:
    writing a flag to the flag register in response to processing data by the CPU;
    wherein the flag is a notification that the data is available for processing.

3. The method of claim 1, wherein fencing outstanding read requests further comprises:
    executing a load acquire instruction for the data using the APD;
    locating outstanding read requests for the data that were issued by the APD; and
    verifying that the synchronization variable has been set to confirm that the data is valid.

4. The method of claim 1, wherein the coherent memory is located in at least one of an APD memory and a system memory.

5. A system for managing a coherent memory between a central processing unit (CPU) and an accelerated processing device (APD) comprising:
    the APD being configured to:
    monitor a flag register to determine whether data stored in the coherent memory is available for processing, wherein the flag register notifies the APD—that data is available for processing in the coherent memory;
    acquire an address pointer for the data in the coherent memory from an address processing device in response to determining data stored in the coherent memory is available for processing;
    fence outstanding read requests associated with the data stored in the coherent memory in response to the determining that data stored in the coherent memory is available for processing by the APD;
    process the data stored in the coherent memory using the APD;
    execute a store release instruction for the data stored in the coherent memory that has been processed by the APD;
    flush processed data that is stored in an APD cache and store the flushed processed data to the coherent memory; and
    set a synchronization variable by the APD to confirm that the data stored in the coherent memory is valid, wherein the synchronization variable is associated with the flag register.

6. The system of claim 5, wherein the CPU is further configured to:
    write a flag to the flag register in response to processing data by the CPU;
    wherein the flag is a notification that the data is available for processing.

7. The system of claim 5, wherein the CPU is further configured to:
    execute a load acquire instruction for the data using the APD;
    locate outstanding read requests for the data that were issued by the APD; and
    verify that the synchronization variable has been set to confirm that the data is valid.

8. The system of claim 5, wherein the coherent memory is located in at least one of an APD memory and a system memory.

9. A non-transitory computer-readable storage medium having instructions for execution by a computing device cause the computing device to perform operations that cause an accelerated processing device (APD) to manage a coherent memory between a central processing unit (CPU)—and the APD, the APD performing the method comprising:
    monitoring a flag register to determine whether data stored in a coherent memory is available for processing, wherein the flag register notifies the APD that data is available for processing in the coherent memory;
    acquiring an address pointer for the data in the coherent memory from an address processing device in response to determining data stored in the coherent memory is available for processing;
    fencing outstanding read requests associated with the data stored in the coherent memory in response to the determining that data stored in the coherent memory is available for processing by the APD;

processing the data stored in the coherent memory using the APD;

executing a store release instruction for the data stored in the coherent memory that has been processed by the APD;

flushing processed data that is stored in an APD cache and storing the flushed data to the coherent memory; and setting a synchronization variable by the APD to confirm that the data stored in the coherent memory is valid, wherein the synchronization variable is associated with the flag register.

10. The non-transitory computer-readable storage medium of claim 9, further comprising:

writing a flag to the flag register in response to processing data by the CPU;

wherein the flag is a notification that the data is available for processing.

11. The non-transitory computer-readable storage medium of claim 9, wherein fencing outstanding read requests further comprises:

executing a load acquire instruction for the data using the APD;

locating outstanding read requests for the data that were issued by the APD; and verifying that the synchronization variable has been set to confirm that the data is valid.

12. The non-transitory computer-readable storage medium of claim 9, wherein the coherent memory is located in at least one of an APD memory and a system memory.

* * * * *